United States Patent
Andersson et al.

[11] Patent Number: 6,062,610
[45] Date of Patent: May 16, 2000

[54] DEVICE FOR THE COUPLING TOGETHER OF PIPES

[75] Inventors: Pontus Andersson, Ängelholm, Sweden; Werner Andresen, Haderslev, Denmark

[73] Assignee: Lindab AB, Bastad, Sweden

[21] Appl. No.: 09/098,823

[22] Filed: Jun. 17, 1998

Related U.S. Application Data

[63] Continuation of application No. PCT/SE96/01690, Dec. 18, 1996.

[30] Foreign Application Priority Data

Dec. 18, 1995 [DK] Denmark ............................ 9500486 U

[51] Int. Cl.⁷ ..................................................... F16L 17/06
[52] U.S. Cl. ........................................... 285/367; 285/424
[58] Field of Search ..................................... 285/373, 367, 285/419, 424, 364

[56] References Cited

U.S. PATENT DOCUMENTS

| | | |
|---|---|---|
| 2,339,759 | 1/1944 | Bidwell . |
| 2,341,828 | 2/1944 | Tetzlaff . |
| 2,395,745 | 2/1946 | King . |
| 2,403,449 | 7/1946 | Meyer et al. . |
| 2,426,423 | 8/1947 | Woolsey . |
| 2,677,164 | 5/1954 | Stade . |
| 2,699,343 | 1/1955 | Troeger et al. . |
| 2,941,823 | 6/1960 | Good . |
| 3,006,663 | 10/1961 | Bowne . |
| 3,235,293 | 2/1966 | Condon . |
| 3,464,722 | 9/1969 | Larkin ..................................... 285/367 |
| 3,479,066 | 11/1969 | Gittleman . |
| 3,517,701 | 6/1970 | Smith ................................. 285/373 X |
| 3,788,677 | 1/1974 | Stade et al. . |
| 4,365,393 | 12/1982 | Hauffe et al. . |
| 4,417,755 | 11/1983 | Gittleman . |
| 4,629,226 | 12/1986 | Cassel et al. ......................... 285/424 X |
| 4,813,720 | 3/1989 | Cassel .................................. 285/424 X |
| 4,822,083 | 4/1989 | Meinig . |
| 5,137,305 | 8/1992 | Straub . |
| 5,170,540 | 12/1992 | Oetiker . |
| 5,505,503 | 4/1996 | Boivin ................................ 285/367 X |

FOREIGN PATENT DOCUMENTS

| | | |
|---|---|---|
| 05081989 | 6/1992 | Denmark . |
| 9400346 | 10/1994 | Denmark . |
| 287755A1 | 10/1988 | European Pat. Off. . |
| 0470201 | 11/1990 | European Pat. Off. . |
| 1475620 | 6/1965 | Germany . |
| 2517808 | 4/1975 | Germany . |
| 604275 | 5/1960 | Italy ......................................... 285/367 |
| 8326971a | 12/1996 | Japan . |
| 466415 | 2/1992 | Sweden . |
| 790109 | 2/1958 | United Kingdom .................. 285/373 |
| 1100183 | 1/1998 | United Kingdom . |
| WO9412295 | 6/1994 | WIPO . |
| WO967848 | 3/1996 | WIPO . |
| WO9722828 | 6/1997 | WIPO . |

Primary Examiner—Dave W. Arola
Attorney, Agent, or Firm—Weingarten, Schurgin, Gagnebin & Hayes LLP

[57] ABSTRACT

A device for coupling together pipes, which at their end have an outwardly directed bead, comprises an annular clamping strap (1) and a clamping mechanism (4–6) arranged at the ends (2a, 2b) of the clamping strap. Between the ends (2a, 2b) of the clamping strap (1), a sealing element (7) is arranged for sealing the joint between the ends (2a, 2b).

12 Claims, 1 Drawing Sheet

DEVICE FOR THE COUPLING TOGETHER OF PIPES

This is a continuation of International Application PCT/SE96/01690, with an international filing date of Dec. 18, 1996, which claims priority to Danish application 9500486 filed Dec. 18, 1995.

FIELD OF THE INVENTION

The present invention relates to a device for coupling together pipes which at their end has an outwardly directed bead.

BACKGROUND OF THE INVENTION

Such a known clamping strap is usually provided with a clamping mechanism, which may consist of, for instance, a screw which is passed through the outwardly bent ends of the clamping strap and which is screwed into an abutment member in the form of a nut or the like. This clamping strap, which in fact functions well, sometimes suffers from a drawback in the form of insufficient sealing in the joint between the two ends of the clamping strap.

Pipes, to which the invention is applicable, are disclosed in e.g. the brochure "Circular Duct System", LindabTransfer, from 1992, issued by Lindab Ltd, as well as in WO 94/12295. Prior-art pipe couplings, which have a certain sealing function and which may be mentioned as examples of prior art, are disclosed in U.S. Pat. No. 3,479,066 and DE-A-25 17 808.

SUMMARY OF THE INVENTION

The object of the invention is to provide in a simple and inexpensive manner a pipe coupling device, which in relation to prior art has improved sealing capacity, especially in the joint between the two ends of the clamping strap.

In accordance with the present invention, apparatus for coupling a first pipe having a rolled, beaded end to a second pipe having a rolled, beaded end includes a sealing element that is disposed between the end of the first pipe and the end of the second pipe, and an annular clamping strap that holds the beaded end of the first pipe and the beaded end of the second pipe against opposing sides of said sealing element.

Thanks to the sealing element in the joint between the end portions of the clamping strap, an excellent seal is established when tightening the clamping strap, since the sealing element then abuts closely against the opposite end portions of the clamping strap and is clamped therebetween, and also fills the joint therebetween.

Further features of the invention are defined in the dependent claims.

BRIEF DESCRIPTION OF THE DRAWINGS

The invention will now be described in more detail with reference to the accompanying drawing, which illustrates an embodiment and in which.

DESCRIPTION OF THE PREFERRED EMBODIMENTS OF THE INVENTION

Figure 1:
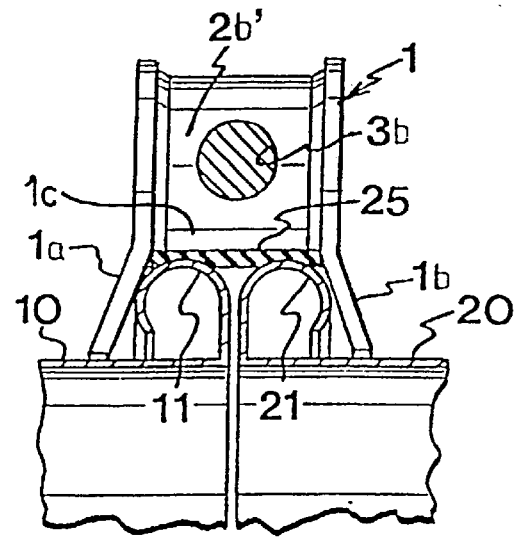
FIG. 1 shows a pipe coupling having a clamping strap according to the invention seen in the direction of arrows I—I in FIG. 2.

FIG. 1 shows a pipe coupling device according to an embodiment of the invention, comprising an annular clamping strap 1 which is U-shaped in cross-section and has two flanges 1a, 1b, and bead bridging member 1c, which surround circumferential end beads 11, 21 of two schematically illustrated pipes 10, 20. The clamping strap 1 is provided with an internal, circumferentially extending seal 25, which preferably is made of an elastic material, e.g. rubber.

Figure 2:
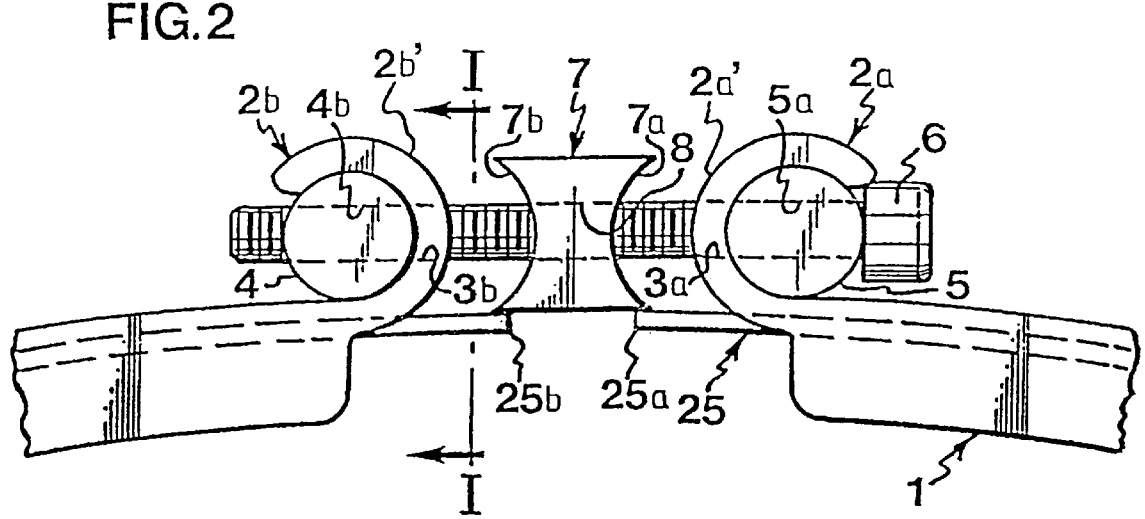
FIG. 2 is a side view of a portion of the clamping strap before the clamping operation.
Figure 3:
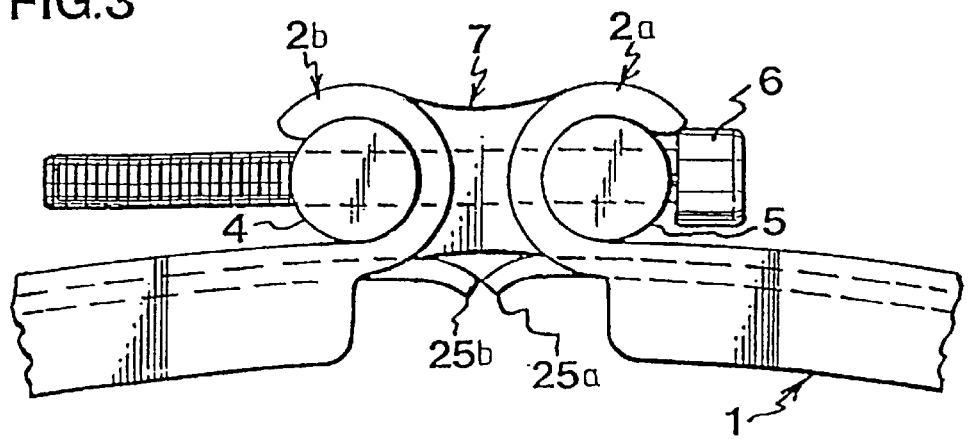
FIG. 3 shows the clamping strap after the clamping operation.

For the sake of simplicity, the tubes 10, 20 are not shown in FIGS. 2 and 3.

FIG. 2 illustrates the clamping strap 2 before the clamping operation. The clamping strap 1 has two end portions 2a, 2b which are bent into part-circular shape and which form pockets, each being formed with an aperture 3a, 3b. The parts of the end portions 2a, 2b facing the joint therebetween have essentially convex surfaces 2a', 2b'.

As shown in FIG. 2 as well as in FIG. 3, there is at one end portion 2b a nut-shaped abutment in the form of a first cylindrical element 4 having a threaded hole 4b. In the other end portion 2a, a second cylindrical element 5 is formed, having an unthreaded hole 5a for a straining screw 6. The cylindrical elements 4 and 5 are preferably arranged to be freely rotatable in said pockets.

Between the two spaced-apart end portions 2a, 2b there is a sealing element 7 made of an elastic material, preferably rubber. The sealing element 7 is formed with a hole 8, preferably an unthreaded hole. By the sealing element 7 being slipped onto the straining screw 6 through the hole 8, the device will be easy to manufacture, while obtaining a very reliable holding of the sealing element 7. The straining screw 6 extends through the aperture 3a in one end portion 2a of the clamping strap 1, through the hole 5a in the cylindrical element 5, further through the hole 8 in the sealing element 7, through the aperture 3b in the opposite end portion 2b of the clamping strap 1 and is finally screwed into the threaded hole 4b of the first cylindrical element 4. The contact surfaces 7a, 7b of the sealing element 7 which are facing the ends of the clamping strap 1, are essentially concave in shape corresponding to the convex shape of the respective opposite end surfaces 2a', 2b' of the end portions 2a, 2b. It is also evident that the internal seal 25 has two ends 25a, 25b which are arranged radially inside the sealing element 7.

The sealing element 7 preferably has the same width as the clamping strap 1, the width being adjusted to the end surfaces 2a', 2b' of the end portions 2a, 2b.

FIG. 3 illustrates the clamping strap 1 after the clamping operation. The sealing element 7 is pressed together and its contact surfaces 7a, 7b engage the opposite end surfaces 2a', 2b' of the end portions 2a, 2b. Thanks to cooperation between the concave contact surfaces 7a, 7b of the sealing element 7 and the convex end surfaces 2a', 2b' of the end portions 2a, 2b of the clamping strap 1, an excellent seal is established in the joint therebetween.

During the clamping operation, the two ends 25a, 25b of the internal seal 25 are pressed against the end beads 11, 21 of the pipes 10, 20 by means of the sealing element 7 (cf. FIG. 1). When the pipes 10, 20 are in place, the ends 25a, 25b are of course pressed against the underside of the sealing element 7. The internal seal 27 and the sealing element 7 thus cooperate for additional sealing of the joint between the two end portions 2a, 2b of the clamping strap 1.

In an alternative embodiment (not shown), the sealing element 7 is attached to one of the end portions of the clamping strap.

According to a further alternative embodiment (not shown), the internal seal 25 of the clamping strap is a closed, endless seal which cooperates with the sealing element 7 in the manner stated above.

We claim:

1. A device for coupling first and second pipe sections, each pipe section having an outwardly directed end bead at a respective end thereof, each end bead having a radially outwardly directed surface and an end surface opposing the other end bead when the first and second pipe sections are coupled in an end-to-end relationship, said device comprising:

an annular clamping strap having two opposite, spaced-apart end portions, the clamping strap being of substantially U-shaped cross-section and comprising:
an annular bead bridging member having a radially inwardly facing inside surface extending linearly across the radially outwardly directed surfaces of the end beads when arranged in the end-to-end relationship, and
two flanges extending inwardly from opposite edges of the bead bridging member, the bead bridging member and the two flanges arranged for securely encompassing the end beads;

a clamping mechanism arranged in connection with the end portions of the clamping strap and adapted to tighten the clamping strap around the end beads of the pipes;

an inner circumferential seal disposed on the inside surface of the bead bridging member of the clamping band to abut against the radially outwardly directed surfaces of the end beads and configured to fill a space between the radially outwardly directed surfaces of the end beads and the inside surface of the bead bridging member without extending into a space between the opposed surfaces of the end beads when coupled in the end-to-end relationship; and a sealing element arranged between the end portions of the clamping strap for connection thereto and for sealing a joint between the end portions when tightening the clamping strap, the sealing element separate from the inner circumferential seal and configured to press against the inner circumferential seal when the clamping strap is tightened around the end beads of the first and second pipe sections, whereby the sealing element and the inner circumferential seal are cooperative to seal a region between the first and second pipe sections.

2. The device as claimed in claim 1, wherein the contact surfaces of the sealing element face the end portions of the clamping strap, and have a shape which essentially corresponds to the shape of the respective opposite end surfaces of the end portions of the clamping strap.

3. The device as claimed in claim 2, wherein said contact surfaces are concave, whereas said opposite end surfaces are convex.

4. The device as claimed in claim 1, wherein the sealing element includes a hole therethrough and the clamping mechanism comprises a straining screw which passes through the hole in the sealing element and connects the end portions of the clamping strap with each other.

5. The device as claimed in claim 4, wherein:
the clamping mechanism further comprises an abutment member;
the end portions of the clamping strap each include an aperture therethrough; and
the straining screw extends through the aperture in one end portion of the clamping strap, further through said hole in the sealing element, through the aperture in the opposite end portion of the clamping strap and is in threaded engagement with the abutment member in connection with said opposite end portion.

6. The device as claimed in claim 4, wherein the hole in the sealing element is an unthreaded hole.

7. The device as claimed in claim 1, wherein the inner circumferential seal has two opposite ends which are adapted to be pressed against the end beads of the pipe sections by the sealing element during said tightening.

8. The device as claimed in claim 1, wherein the sealing element is made of an elastic material.

9. The device as claimed in claim 1, wherein the sealing element has substantially the same width as the clamping strap.

10. The device as claimed in claim 1, wherein:
the sealing element includes an unthreaded hole formed therethrough, is made of an elastic material, and has substantially the same width as the clamping strap;
the end portions of the clamping strap each include an aperture therethrough;
the clamping mechanism comprises a straining screw which connects the end portions of the clamping strap with each other and an abutment member having a threaded hole therethrough; and
the straining screw extends through the aperture in one end portion of the clamping strap, further through said hole in the sealing element, through the aperture in the opposite end portion of the clamping strap and is in threaded engagement with the threaded hole through the abutment member abutting said opposite end portion.

11. The device of claim 1, wherein the sealing element is made of rubber.

12. The device of claim 1, wherein the sealing element has the same width as the end surfaces of the end portions.

* * * * *

UNITED STATES PATENT AND TRADEMARK OFFICE
CERTIFICATE OF CORRECTION

PATENT NO. : 6,062,610
DATED : May 16, 2000
INVENTOR(S) : Pontus Andersson et al.

It is certified that error appears in the above-identified patent and that said Letters Patent is hereby corrected as shown below:

Column 1,
Line 37, "rolled, beaded" should read -- beaded --; and
Line 38, "rolled, beaded" should read -- beaded --.

Signed and Sealed this

Second Day of July, 2002

Attest:

Attesting Officer

JAMES E. ROGAN
Director of the United States Patent and Trademark Office